United States Patent [19]

Freehafer

[11] 4,403,570
[45] Sep. 13, 1983

[54] ANIMAL WATERER

[75] Inventor: Donald H. Freehafer, Byron Township, Kent County, Mich.

[73] Assignee: Cyclone International Incorporated, Holland, Mich.

[21] Appl. No.: 338,469

[22] Filed: Jan. 11, 1982

[51] Int. Cl.³ .............................................. A01K 7/00
[52] U.S. Cl. .................................... 119/72.5; 119/75; 251/303
[58] Field of Search ............... 251/303, 298; 119/72.5, 119/75

[56] References Cited

U.S. PATENT DOCUMENTS

| | | | |
|---|---|---|---|
| 3,289,635 | 12/1966 | Eagles | 119/75 |
| 3,550,560 | 12/1970 | Edstrom | 119/72.5 |
| 3,646,955 | 3/1972 | Olde | 119/75 |
| 3,698,685 | 10/1972 | Lang | 251/303 |
| 4,258,666 | 3/1981 | Edstrom | 119/72.5 |
| 4,338,884 | 7/1982 | Atchley et al. | 119/72.5 |
| 4,346,672 | 8/1982 | Niki | 119/72.5 |

*Primary Examiner*—Jay N. Eskovitz
*Attorney, Agent, or Firm*—Flynn, Thiel, Boutell & Tanis

[57] ABSTRACT

A nipple-type waterer having a resilient elastomeric plug which functions both as the spring and as the orifice member for regulating flow through the device. The elastomeric plug bears against the head of the valve stem and is threadably seated within the housing and adjustably positioned for varying the resilient closing force imposed on the valve stem. The usual O-ring creates the main seal between the housing and the outer side of the valve stem head. The elastomeric plug also has an annular sealing ridge thereon which creates a second area of sealed engagement with the rear side of the valve stem head.

13 Claims, 2 Drawing Figures

4,403,570

ANIMAL WATERER

FIELD OF THE INVENTION

This invention relates to a valve for controlling flow of water and, in particular, an improved waterer for animals, specifically a nipple-type waterer.

BACKGROUND OF THE INVENTION

Devices for permitting self-watering of animals, such as hogs, poultry and other small animals, are utilized extensively and are of many different variations. For example, many such watering devices utilize a ball check valve which is actuated by the animal for permitting opening of the device when water flow is desired. These devices are utilized particularly with very small animals, but even these devices have been less than satisfactory since leakage past the ball check valve due to improper seating thereof is a common occurrence. Often the ball valve has to be properly seated by use of a spring, which thus makes the valve more difficult to actuate than desired.

With many animals, specifically larger animals such as hogs, the watering device is conventionally of the nipple type. That is, the water supply line has a body fixed thereto, which body has an elongated valve element projecting outwardly therefrom. The inner end of this valve element is normally provided with an enlarged disklike head which is sealingly seated against a suitable O-ring, and a normally-closed sealed relationship is maintained by means of an internal spring. When the animal contacts the projecting stem or nipple of the valve element and displaces same sidewardly (that is, angularly), this tilts the valve head away from the O-ring, thereby breaking the seal and permitting controlled discharge of water only so long as the animal maintains the valve stem in a tilted condition.

While nipple-type waterers of this general type have been and still are extensively utilized, particularly for hogs, nevertheless the overall operation and durability of such waterers has been less than desired. For example, such devices normally can be made so as to not leak only by providing same with a rather heavy spring. However, this in turn makes the watering device more difficult to actuate and less sensitive with respect to the force required for opening the valve, such as if same is desired for use with a very small animal. Further, these conventional devices have not possessed a suitable and accurate capability of adjusting the spring tension so as to provide the valve with a closing or sealing force which has the desired sensitivity over a selected range. The spring also increases the size and complexity of the overall device, and the device also normally involves an undesirable number of individual components. These known waterers also normally employ metal valve components, and hence have a tendency to corrode.

In an attempt to improve upon such nipple-type watering devices so as to eliminate the requirement of an internal spring and thereby make the device more suitable for use with small animals, there has been developed a nipple-type waterer which utilizes a platelike perforated diaphragm of elastomeric material positioned so as to resiliently engage and stretch across the head of the valve stem. This diaphragm urges the valve head against an O-ring and normally maintains the valve stem in its closed position. While this development, examples of which are illustrated by U.S. Pat. Nos. 3,550,560 and 4,258,666, has resulted in some simplification of the device and hence has met with at least some commercial acceptance, nevertheless even this device is still considered less than optimum. For example, with this device, the seal is effectively created only at a single location, namely between the valve stem head and the O-ring. Further, due to the thinness of the platelike elastic diaphragm, the device does not possess any significant adjustability with respect to the resilient force created for maintaining the valve in its closed position.

Accordingly, it is an object of the present invention to provide an improved valve device and in particular a watering device for animals such as poultry and hogs, specifically a nipple-type waterer, which improves upon the known type watering devices as described above.

More specifically, the present invention relates to an improved waterer which eliminates use of a conventional spring, but instead employs a resilient elastomeric plug which functions both as the spring and as the orifice member for regulating flow through the device. The elastomeric plug bears against the head of the valve stem and is threadably seated within the housing and adjustably positioned for varying the resilient closing force imposed on the valve stem with precise and sensitive adjustment occurring over a substantial range. In addition to the usual O-ring which creates the main seal between the housing and the front or outer side of the valve stem head, the elastomeric plug also has an annular sealing ridge thereon which creates a second area of sealed engagement with the rear or inner side of the valve stem head. Closure of the valve thus creates annular seal areas adjacent both the front and rear sides of the valve stem head, thereby providing a more positive seal and hence a substantially leak-proof valve, while at the same time permitting minimization of the resilient force required for closing and hence sealing the valve. Thus, the valve can have greater sensitivity so as to permit opening of same by very small animals. At the same time, the elastomeric plug possesses substantial durability so as to permit its use by small or large animals, such as hogs, with the valve being usable over a large number of cycles without fear of failure, and with the resilient plug being suitably adjustable to provide a higher closing force when use with larger animals is desired.

In addition to the structural and functional advantages of the improved valve of this invention, as explained above, this improved watering device is also desirable since it is of an extremely simple and compact structure, possesses a minimum number of components so as to permit its economical manufacture and assembly, and employs a nonmetal orifice member so as to resist corrosion.

Other objects and purposes of the invention will be apparent to persons familiar with watering devices of this general type upon reading the following specification and inspecting the accompanying drawings.

Figure 1:
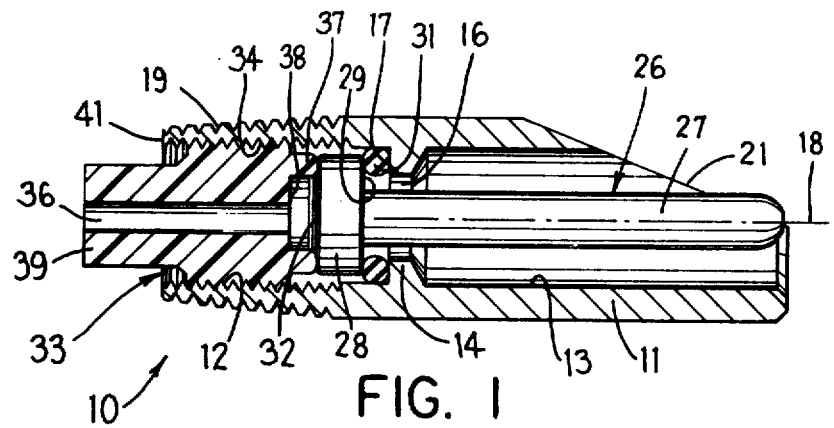
FIG. 1 is a longitudinal central sectional view of the improved waterer of this invention, same being illustrated in its normally closed position.

Certain terminology will be used in the following description for convenience in reference only, and will not be limiting. For example, the words "upwardly", "downwardly", "leftwardly" and "rightwardly" will refer to directions in the drawings to which reference is made. The words "inner" and "outer" will refer to directions toward and away from, respectively, the geometric center of the device and designated parts thereof. The words "outer" or "front" will refer to the end of the device as actuated by the animal, specifically the rightward end as appearing in FIGS. 1 and 2.

DETAILED DESCRIPTION

Referring to the drawings, there is illustrated the improved watering device 10 of the present invention, which device is a nipple-type waterer. This waterer 10 is normally maintained in a nonflow or closed position, as illustrated by FIG. 1, with controlled flow being permitted therethrough when the valve is moved by an animal into the open position illustrated by FIG. 2.

The waterer 10 includes a substantially tubular body or housing 11 which, in view of the improved construction of this invention, can be of a one-piece structure. This tubular housing 11 defines therethrough an elongated cylindrical opening having a rear portion 12 which opens inwardly from the rearward end of the housing and a front portion 13 which opens inwardly from the other end of the housing. The rear opening 12 is appropriately internally threaded. These aligned openings 12 and 13 are also suitably separated by means of an intermediate annular flange 14 which, in the illustrated embodiment, is integral with and projects radially inwardly of the housing 11. This flange defines therethrough a reduced diameter opening 16 which communicates with and is coaxially aligned with the openings 12-13. This internal flange 14 also defines an annular valve seat 17 on the rear surface thereof, which valve seat is disposed within a plane which extends substantially perpendicular to the longitudinally extending axis 18 of the housing. The rearward end of the housing 11 is also preferably provided with an external thread 19 thereon so as to enable the waterer to be threadably secured to a water supply pipe (not shown) in a conventional manner.

The forward end of the housing 11, when the waterer is of the nipple type, is also preferably formed with a cutout or tapered end surface 21 so as to provide improved access to the stem of the valve, as is conventional.

The valve housing 11 mounts thereon a valve member 26 which includes a substantially elongated rodlike stem or nipple 27 having an enlarged disklike head 28 fixed to the inner end thereof. This disklike head 28 is normally of a substantially cylindrical cross section as viewed perpendicular to the longitudinal axis of the stem 27, and has substantially planar and parallel upper and lower surfaces 29 and 31, respectively.

The head 28 has a diameter which substantially exceeds the diameter of opening 16, but which is substantially smaller than the diameter of opening 12 so as to readily permit desired flow of water around the exterior periphery of the head. The stem 27, on the other hand, has a diameter which is substantially smaller than the diameter of opening 16, whereupon the stem thus projects coaxially through this opening 16 so that the free end (that is, the outer end) of the stem is thus positioned adjacent and normally projects slightly beyond the outer free end of the housing 11 so as to be readily accessible to the animal. The head 28, as illustrated, is positioned within the housing rearwardly of but closely adjacent the flange 14 so that the front surface 29 of the head radially overlaps the valve seat 17.

An elastomeric seal ring 31 of circular cross section, conventionally known as an O-ring, is positioned within the opening 13 so as to seat against the valve seat 17. This O-ring has an outer diameter which is sized so as to enable it to closely fit within the opening 13 to create an annular sealing contact between the seal ring and the valve seat. This O-ring also normally creates an annular sealing contact with the outer or front surface 29 on the valve head 28, as explained hereinafter.

The rear housing opening 12 has a substantially cylindrical plug 33 seated therein. This plug 33 is formed in one piece of a suitable elastomeric material, and is suitably externally threaded so as to be sealingly seated within the internal threads 34 formed on the housing in surrounding relationship to the rear opening 12. The elastomeric plug 33 is of substantial axial length, and in fact has an axial length which is preferably at least equal to its diameter, so that the plug possesses substantial structural strength and durability and can hence create an extremely effective seal throughout its threaded engagement with the housing.

The elastomeric plug 33 effectively functions as an orifice member for controlling the flow of water from its source into the interior end of the rear housing opening 12. For this purpose, the plug 33 has a small orifice or opening 36 extending axially therethrough substantially along its longitudinal centerline, which orifice 36 is normally of very small diameter to thereby regulate the volume of water which can be supplied to and through the device.

The forward end of the plug 33 has a suitable seal ring 37 thereon, which seal ring 37 concentrically surrounds the orifice 36. The seal ring 37, in the illustrated embodiment, is formed as an annular ridge which is integral with the plug 33 and projects axially forwardly beyond the end face 38 thereof. This seal ridge 37, when viewed in cross section, has a rounded configuration which resembles a semi-circle so that the seal ring 37 hence effectively functions in a manner extremely similar to a conventional O-ring. This seal ring 37 creates an annular sealing contact with the inner or rear surface 32 of the valve head 28 and maintains the valve head face 32 spaced from the plug end face 38. The seal ridge 37 is of a diameter similar to that of the O-ring 31 so that the valve head 28, when in the closed position illustrated by FIG. 1, has substantially opposed annular seal areas on the front and rear faces thereof.

To facilitate access to the plug 33, same is preferably provided with a reduced-diameter portion 39 projecting axially from the rearward end thereof. This portion 39, which effectively functions as a gripping knob, is coaxially aligned with the overall plug and projects axially rearwardly a sufficient distance so as to project outwardly a substantial extent beyond the rearward end face 41 of the housing, thereby facilitating gripping of the plug 33 so as to permit rotation thereof. This projection or knob 39 can be provided with a suitable external profile, such as a hexagonal profile, to permit gripping and engagement of same by a tool if desired.

The elastomeric plug 33 is threaded into the housing 10 a sufficient extent to cause the seal ridge 37 to engage and create an annular area of sealed engagement with the rear face 32 of the valve head 28. By increasing the inward rotation of the plug into the housing, this effects an increased compression of the seal ridge 37 against the valve head 28, whereupon the elastomeric plug 33 thus also effectively functions as a spring so as to thereby adjust the resilient force holding the valve head 28 in its closed position. The greater the inward rotation of the plug 33, the greater the compression of the plug against the valve head 28, and hence the greater the sideward external force which must be imposed on the valve stem 27 in order to angularly deflect same into an open position.

The plug 33 is preferably constructed of polyurethane since same is inert and hence creates no toxicity problems with respect to the water flowing therethrough. Further, polyurethane can be suitably molded into the desired configuration, and possesses the required durability coupled with the desired elasticity. The plug 33 is preferably provided with a Durometer in the range of 60 to 80 when the waterer is designed for use with hogs. However, other elastomeric materials having equivalent properties could obviously be utilized.

OPERATION

To maintain the valve member 26 in its closed position as illustrated in FIG. 1, the elastomeric plug 33 is threaded a sufficient extent into the housing so as to cause the valve head 28 to be effectively compressed between the O-ring 31 and the seal ridge 37. Both the O-ring 31 and seal ridge 37 are suitably resiliently compressed, at least a limited extent, to create annular seal areas on both faces 29 and 32 of the valve head 28.

Figure 2:
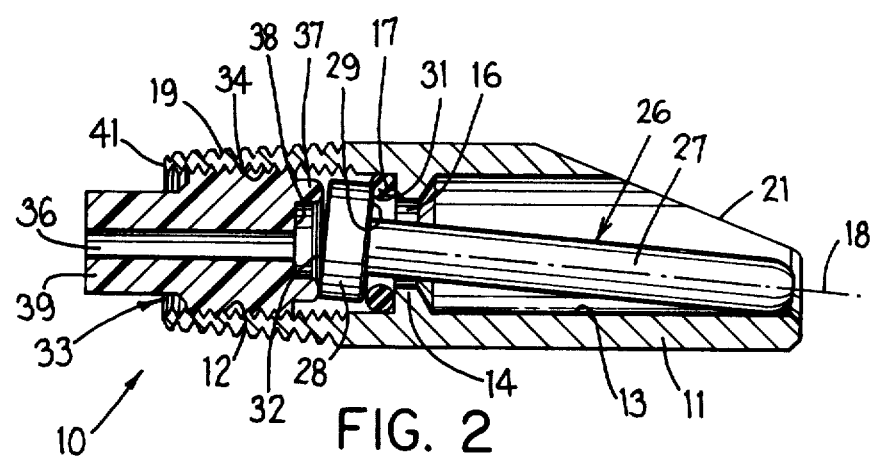
FIG. 2 is a view similar to FIG. 1 but showing the valve in its opened or actuated position.

To activate the valve into the open position of FIG. 2, an external sideward force is imposed by the animal on the valve stem 27, thereby causing the valve stem to be angularly deflected downwardly (or sidewardly). This causes the valve member 26 to effectively rock or tilt about the valve head 28, thereby disrupting the seal areas created by the O-ring 31 and seal ridge 37. Specifically, the tilting of the valve head causes the sealed engagement between the head 28 and O-ring 31 to be disrupted along one diametrical side of the valve head, and the sealed engagement between the head 28 and the seal ridge 37 to be disrupted at a substantially diametrically opposite location. Hence, water can then flow from the source through orifice 36 into the interior region defined behind the valve head 28 and within the seal ridge 37, from which the water then flows outwardly past the seal ridge 37 and then axially around the periphery of the seal head 28, and thence radially inwardly past the O-ring 31 into the reduced opening 16, from which it flows into the front opening 13 so as to be available to the animal.

As soon as the animal releases the valve stem 27, the resiliency of plug 33 acting through the seal ridge 37 immediately returns the valve member 26 to the closed position of FIG. 1.

In order to selectively adjust the opening force for the waterer, such as by either increasing or decreasing the opening force, the elastomeric plug 33 is suitably screwed into or out of the body 11 in order to respectively increase or decrease the compression of the seal ridge against the valve head.

Thus, the integral one-piece plug 33 of this invention is hence a multi-purpose member since it simultaneously functions as an orifice, a spring and a seal. At the same time, this one-piece multi-purpose plug enables the housing 11 to also be of a one-piece structure, so that the overall device is hence structurally simple while at the same time providing an extremely durable device having a substantially wide but sensitive range of opening force. The overall number of components which make up the overall device is also minimized.

While the one-piece housing 11 in the illustrated embodiment has the flange 14 integral therewith, it will be appreciated that flange 14 could initially be a separate ring which is then suitably positioned within and nonremovably fixed to the tubular member so as to effectively define a one-piece housing.

While the invention as disclosed relates to nipple-type waterers, nevertheless the invention is also applicable to cut-type waterers for animals.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a nipple-type watering device for animals, including an elongated housing having an elongate passage extending therethrough, said housing having means associated therewith for defining an annular flange in surrounding relationship to said passage, said annular flange defining thereon a rearwardly facing valve seat which is spaced from the opposite ends of said passage, an annular elastomeric seal ring seated on said valve seat, and a valve member tiltable relative to the housing between open and closed positions, said valve member having an elongated stem which projects substantially axially of said passage from a location adjacent the front end thereof inwardly through said seal ring, said valve member also having an enlarged platelike valve head fixed to the inner end of said stem, said valve head having a front face which is normally maintained in sealing engagement with said seal ring to create a first annular band of sealing engagement, said valve member being free of interior flow passages so that opening of said valve member permits flow of water around said valve head and then across said seal ring and thence exteriorly of said stem, comprising the improvement wherein a one-piece cylindrical member of an elastomeric material is sealingly seated within the rearward portion of said passage, said cylindrical member having an annular elastomeric sealing ridge integrally formed thereon and projecting axially forwardly thereof for engagement with a rear face on said valve head to create a second annular band of sealing engagement, said elastomeric ridge also resiliently urging said valve member forwardly to sealingly press said valve head against said seal ring which in turn is sealingly pressed against said valve seat, and said cylindrical member having a small flow orifice extending axially therethrough, said orifice at its forward end opening into a region surrounded by said annular sealing ridge.

2. A device according to claim 1, wherein said elastomeric cylindrical member is threadably engaged with internal threads formed on said housing in surrounding relationship to the rear portion of said passage, and wherein said device is free of separate springs so that said elastomeric cylindrical member is the only structure which resiliently urges said valve member forwardly to normally maintain it in said closed position.

3. A device according to claim 2, wherein said cylindrical member has an axial length which is at least approximately equal to its diameter.

4. A device according to claim 2 or claim 3, wherein said housing is constructed as a one-piece structure and has an internal annular wall which defines thereon said valve seat.

5. A device according to claim 2, wherein said cylindrical member includes a projecting portion which is of reduced diameter and which projects axially rearwardly a substantial distance beyond the rear free end of the housing.

6. A device according to claim 1 or claim 2, wherein said cylindrical member is constructed of polyurethane and has a Durometer in the range of approximately 60 to 80.

7. A device according to claim 6, wherein said housing comprises an integral one-piece structure having an elongate tubular configuration, said housing also having an integral annular wall which projects radially inwardly of the tubular configuration and defines said valve seat thereon.

8. An adjustable, openable and closable valve, such as for a waterer, comprising:
   a tubular body structure having an opening extending therethrough, said body structure including an inner annular wall which projects radially inwardly and defines a front opening portion of smaller diameter, which said front opening portion defines a part of said opening, said annular wall defining thereon a rearwardly facing valve seat in surrounding relationship to said front opening portion;
   said opening including a rear opening portion which extends axially between said valve seat and the rearward end of said body structure, said rear opening portion being coaxially aligned with but of substantially larger diameter than said front opening portion;
   an annular elastomeric seal ring positioned within said rear opening portion and positioned directly adjacent said valve seat for creating an annular sealed engagement therewith;
   a movable valve member having an enlarged substantially cylindrical platelike valve head positioned within said rear opening portion directly behind said seal ring so that said seal ring creates an annular sealed engagement with said valve head, said valve member also including a small rodlike valve stem coaxially fixed to said valve head and projecting axially forwardly thereof, said valve stem projecting axially through said seal ring and through said front opening portion, said valve stem as it projects through said front opening portion being of smaller diameter than said front opening portion to permit flow therebetween and to also permit the valve stem to be angularly tilted relative to the body structure; and
   one-piece elastomeric plug means sealingly seated on said body structure within said rear opening portion, said one-piece elastomeric plug means having an integral annular sealing rib projecting axially from the forward end thereof and disposed for creating an annular sealing engagement with the rear surface of said valve head and for resiliently urging said valve head against said seal ring, said plug means also having a small diameter flow orifice extending axially therethrough and opening into a region defined within said annular sealing rib.

9. A device according to claim 8, wherein said plug means is threadably engaged with said body structure and can be relatively rotated to axially adjust the position of said plug means relative to said body structure to thereby vary the compression of the sealing rib against the valve head, and wherein said plug means is the sole structure for resiliently urging the valve head forwardly toward said valve seat to normally maintain the valve member in a closed position.

10. A device according to claim 9, wherein said valve member is tiltable about said valve head so that one of said annular sealed engagements adjacent the front side of the valve head is broken at one diametral side thereof whereas the annular sealed engagement adjacent the rear side of the valve head is broken at the opposite diametral side thereof.

11. A device according to claim 10, wherein said elastomeric plug means comprises a cylindrical member constructed of polyurethane having a Durometer in the range of approximately 60 to 80.

12. A device according to claim 8, wherein said valve member is tiltable about said valve head so that one of said annular sealed engagements adjacent the front side of the valve head is broken at one diametral side thereof whereas the annular sealed engagement adjacent the rear side of the valve head is broken at the opposite diametral side thereof.

13. A device according to claim 1, wherein said valve stem as it projects through said annular flange is of substantially smaller diameter than the opening defined by said flange to permit flow therebetween when the valve stem is angularly tilted relative to the housing so as to be in said open position, said valve member being tiltable about said valve head so that the annular seal adjacent the front of the valve head is broken at one diametral side thereof whereas the annular seal adjacent the rear of the valve head is broken at the opposite diametral side thereof.

* * * * *